United States Patent
Sundaresan et al.

(10) Patent No.: US 10,735,197 B2
(45) Date of Patent: Aug. 4, 2020

(54) BLOCKCHAIN-BASED SECURE CREDENTIAL AND TOKEN MANAGEMENT ACROSS MULTIPLE DEVICES

(71) Applicant: Workday, Inc., Pleasanton, CA (US)

(72) Inventors: Prakash Sundaresan, Redmond, WA (US); Lionello G. Lunesu, Peng Chau (HK); Antoine Cote, Sheung Wan (HK)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 15/961,791

(22) Filed: Apr. 24, 2018

(65) Prior Publication Data

US 2019/0036700 A1 Jan. 31, 2019
US 2020/0213118 A9 Jul. 2, 2020

Related U.S. Application Data

(63) Continuation-in-part of application No. 15/662,417, filed on Jul. 28, 2017.
(Continued)

(51) Int. Cl.
*H04L 9/32* (2006.01)
*H04L 9/08* (2006.01)
*H04L 9/30* (2006.01)

(52) U.S. Cl.
CPC .......... *H04L 9/3234* (2013.01); *H04L 9/0891* (2013.01); *H04L 9/30* (2013.01);
(Continued)

(58) Field of Classification Search
CPC ... H04L 9/0825; H04L 9/3247; H04L 9/3213; H04L 63/0807; H04L 63/0823
See application file for complete search history.

(56) References Cited

U.S. PATENT DOCUMENTS 9,397,980 B1 * 7/2016 Chen .................. H04L 9/3263
2008/0010449 A1 1/2008 Holtzman
(Continued)

FOREIGN PATENT DOCUMENTS

GB 2539430 A * 12/2016 .......... G06Q 20/065

OTHER PUBLICATIONS

Andreas M. Antonopoulos, "Mastering Bitcoin Programming the Open Blockchain", Jun. 1, 2017, O'Reilly, 2nd Edition, Chapter 5 (Year: 2017).
(Continued)

*Primary Examiner* — Ellen Tran
(74) *Attorney, Agent, or Firm* — Van Pelt, Yi & James LLP

(57) ABSTRACT

An embodiment herein provides a processor implemented method for blockchain-based secure credential and token management for open identity management that enables a first device to provision at least one additional device to present tokens issued to the first device, that includes i) creating, using a hardware-based cryptographic processor on a first device associated with an end user, a first set of credentials; ii) obtaining and caching at least one attestation token from one or attestation issuing parties, the at least one attestation token is restricted by default to be unusable from any device other than the first device; (iii) providing the at least one attestation token to at least one relying party that is interested in receiving attestations about the end user; and iv) signing a trust record on the blockchain using the first device associated with the end user.

20 Claims, 7 Drawing Sheets

Related U.S. Application Data

(60) Provisional application No. 62/368,875, filed on Jul. 29, 2019, provisional application No. 62/489,772, filed on Apr. 25, 2017.

(52) U.S. Cl.
CPC .......... *H04L 9/3213* (2013.01); *H04L 9/3226* (2013.01); *H04L 9/3239* (2013.01); *H04L 9/3247* (2013.01); *H04L 2209/38* (2013.01)

(56) References Cited

U.S. PATENT DOCUMENTS

| | | |
|---|---|---|
| 2010/0138652 A1 | 6/2010 | Sela |
| 2016/0086175 A1* | 3/2016 | Finlow-Bates |
| 2016/0261411 A1* | 9/2016 | Yau .................... H04L 63/0807 |
| 2016/0275461 A1 | 9/2016 | Sprague |
| 2017/0147808 A1* | 5/2017 | Kravitz .................. G06F 21/45 |
| 2017/0155513 A1 | 6/2017 | Acar |
| 2017/0180128 A1 | 6/2017 | Lu |
| 2017/0222815 A1 | 8/2017 | Meriac |
| 2017/0344988 A1 | 11/2017 | Cusden |
| 2017/0357966 A1 | 12/2017 | Chandrasekhar |
| 2018/0006826 A1 | 1/2018 | Smith |
| 2019/0266334 A1 | 8/2019 | Robison |

OTHER PUBLICATIONS

Biryukov et al.,"Argon2: new generation of memory-hard functions for password hashing and other applications", 2016, IEEE, pp. 292-300 (Year 2016).

\* cited by examiner

| 202 | 204 | 206 | 208 |
|---|---|---|---|
| CredAPubKey | CredBPubKey | TxID | ContractName |
|  |  |  |  |

FIG. 2A

| CredAPubKey | CredBPubKeySet | Permissions | Quorum | TxID | ContractName |
|---|---|---|---|---|---|
|  |  |  |  |  |  |

FIG. 2B

| 216 | 202 | 218 | 206 | 208 |
| --- | --- | --- | --- | --- |
| TokenID | CredAPubKey | IssuerPubKey | TxID | ContractName |
|  |  |  |  |  |

FIG. 2C

| 216 | 220 | 206 | 208 |
|---|---|---|---|
| TokenID | RevokerPubKey | TxID | ContractName |
|  |  |  |  |

FIG. 2D

BLOCKCHAIN-BASED SECURE CREDENTIAL AND TOKEN MANAGEMENT ACROSS MULTIPLE DEVICES

CROSS-REFERENCE TO RELATED APPLICATIONS

This application is a continuation in part of co-pending U.S. patent application Ser. No. 15/662,417 entitled BLOCKCHAIN-BASED DIGITAL IDENTITY MANAGEMENT (DIM) SYSTEM filed Jul. 28, 2017, which is incorporated herein by reference for all purposes, which claims priority to U.S. Provisional Application No. 62/368,875, entitled TRUSTED KEY BLOCKCHAIN-BASED IDENTITY MANAGEMENT SYSTEM TOWARDS A WORLD OF STRONG IDENTITY, SECURITY AND SMART CONTRACTS filed Jul. 29, 2016, which is incorporated herein by reference for all purposes, and U.S. Provisional Application No. 62/489,772, entitled BLOCKCHAIN-BASED CREDENTIAL AND TOKEN MANAGEMENT IN THE TRUSTED KEY IDENTITY SYSTEM filed on Apr. 25, 2017 which is incorporated herein by reference for all purposes. This application also claims priority to U.S. Provisional Patent Application No. 62/489,772 entitled BLOCKCHAIN-BASED CREDENTIAL AND TOKEN MANAGEMENT IN THE TRUSTED KEY IDENTITY SYSTEM filed Apr. 25, 2017 which is incorporated herein by reference for all purposes.

BACKGROUND

Technical Field

The embodiments herein generally relate to blockchain-based secure credential and token management, and more particularly, to a system and the method for open identity management that enables a first device to provision at least one additional device to present tokens issued to the first device.

Description of the Related Art

Mobile devices have been increasingly associated with the identity of users to authenticate them for making payments, accessing bank accounts, email, etc. When a mobile device of a user is stolen and the personal identification number (PIN)/pattern used to lock the device is known, the identity of the user and access to multiple accounts is compromised. This is an example of identity theft. Another example is identity theft results from information that has been obtained by hacking or from compromises in websites. The leaked information may include social security number (SSN), date of birth, etc. that criminals use to open accounts and credit cards. Millions of consumers have been victims of identity theft.

Most existing systems employ the use of a simple password or PIN to authenticate the user. Despite the ubiquity of password-based systems, it has many problems. An ideal password needs to be easily remembered by the user. However, in order for passwords to be secure, they should be long and hard to predict, contradictory to the former requirement. This is further exacerbated by the proliferation of passwords for the multitude of applications a user typically uses, for which security best practice recommends different passwords should be used.

Passwords are inherently insecure for multiple reasons. People often use the same or a limit set of passwords across multiple sites. Consequently, a compromise or hacking at one website with poor security practices leads to compromise of the user's accounts at other sites where the user has used the same password. There are websites that offer username-password credentials for sale. Present solutions are inefficient or attempt to merely provide a patch or temporary solution. A need exists for a fundamental redesign of the identity management systems to make identities and devices secure even in the event that a device is lost or stolen and a PIN or password is hacked.

Accordingly, there remains a need for a secure identity management system for users across multiple devices.

SUMMARY

In view of foregoing, an embodiment herein provides a processor implemented method for blockchain-based secure credential and token management for open identity management that enables a first device to provision at least one additional device to present tokens issued to the first device. The method includes the steps of: (i) creating, using a hardware-based cryptographic processor on a first device associated with an end user, a first set of credentials including a blockchain-compatible public-private key pair associated with the end user, the blockchain-compatible public-private key pair includes an end user public key and an end user private key, and the end user public key is freely published and the end user private key is protected by at least one of the end user's password, biometric or PIN code; (ii) obtaining and caching at least one attestation token from at least one attestation issuing party, the at least one attestation token is restricted by default to be unusable from any device other than the first device, and the at least one attestation issuing party attests information that they are authorized to validate with reference to the end user; (iii) providing the at least one attestation token to at least one relying party, the validity of the at least one attestation token is determined using a blockchain, and (iv) signing a trust record on the blockchain using the first device associated with the end user to indicate that the first set of credentials trusts a second set of credentials associated with a second user device as long as the first set of credentials are valid, to indicate to the at least one relying party that the at least one attestation token presented by the second set of credentials from the second device are acceptable to the blockchain, and signing the trust record on the blockchain overcomes the restriction by default that the at least one attestation token is to be unusable from any device other than the first device.

A revoke privilege to the second device is delegated that signs a revoke record on the blockchain referencing the first device to decommission the first device. Delegate credentials and a policy for delegation for the first device may be registered on the blockchain. In yet another embodiment, the delegate credentials include designating that the second set of credentials on the second device has permissions to revoke the first set of credentials on the first device, so that the second device can revoke the first set of credentials on the first device by signing a blockchain transaction from the second device.

In yet another embodiment, the delegate credentials include designating at least one device other than the first device to have permission to take over the first set of credentials from the first device and assign the first set of credentials to a new device, by designating that the at least one device have to sign a takeover transaction on the blockchain. In yet another embodiment, when the at least one attestation issuing party issues at least one attestation token to the first device associated with end user, the at least one attestation token is registered on the blockchain by associating the at least one attestation token with the public key of the end user and are signed by the issuing party private key. In yet another embodiment, an attestation token is revoked by signing a revoke record using a private key associated with a revoker device and making an entry in the blockchain only when a public key of the revoker device is either the public key of the end user to which the attestation token was issued by the at least one attestation issuing party or the public key of the at least one attestation issuing party.

In another aspect, a system for blockchain-based secure credential and token management for open identity management that enables a first device to provision at least one additional device to present tokens issued to the first device is provided. The system includes a hardware-based cryptographic processor, a device processor and a non-transitory computer readable storage medium. The non-transitory computer readable storage medium includes one or more module executable by the device processor. The hardware-based cryptographic processor creates, on the first device associated with an end user, a first set of credentials that includes a blockchain-compatible public-private key pair associated with the end user. In one embodiment, the first set of blockchain-compatible public-private key pair includes an end user public key and an end user private key. In one embodiment, the end user public key is published and the end user private key is protected by at least one of the end user's password, biometric or PIN code. The attestation token management module obtains and caches at least one attestation token from at least one attestation issuing party. In one embodiment, the at least one attestation token is restricted by default to be unusable from any device other than the first device, and the at least one attestation issuing party attests information that they are authorized to validate with reference to the end user.

The attestation token providing module provides the at least one attestation token to at least one relying party that is interested in receiving attestations about the end user, and the validity of the at least one attestation token is determined using a blockchain. The trust record signing module signs a trust record on the blockchain using the first device associated with the end user to indicate that the first set of credentials trusts a second set of credentials associated with a second user device as long as the first set of credentials are valid, to indicate to the at least one relying party that the at least one attestation token presented by the second set of credentials from the second device are acceptable to the blockchain. In one embodiment, signing the trust record on the blockchain overcomes the restriction by default that the at least one attestation token are to be unusable from any device other than the first device.

In one embodiment, the device decommissioning module delegates a revoke privilege to the second device that signs a revoke record on the blockchain referencing the first device to decommission the first device. In another embodiment, a credential registering module registers delegate credentials and a policy for delegation for the first device on the blockchain. The at least one relying party device include a token validation module and a trust checking module. The token validation module validates the at least one attestation token that is signed using a second set of credentials and a second private key that is associated with the second device by checking that a token identification (ID) is not revoked, a public key that is associated with the second set of credentials is not revoked, and that trust exists between the first set of credentials and the second set of credentials. The trust checking module checks whether trust exists between the first set of credentials and the second set of credentials based on whether they are equal, or whether a sequence of records exists in a trust credentials record in the blockchain which establish a trust relationship between the first set of credentials and the second set of credentials. In yet another embodiment, the delegate credentials include designating that the second set of credentials on the second device has permissions to revoke the first set of credentials on the first device, so that the second device can revoke the first set of credentials on the first device by signing a blockchain transaction from the second device.

In yet another embodiment, the delegate credentials include designating at least one device other than the first device to have permission to take over the first set of credentials from the first device and assign the first set of credentials to a new device, by designating that the at least one device have to sign a takeover transaction on the blockchain. In yet another embodiment, when the attestation issuing party issues at least one attestation token to the first device associated with end user, the at least one attestation token are registered on the blockchain by associating the at least one attestation token with the public key of the end user and are signed by the issuing party private key. In yet another embodiment, an attestation token is revoked by signing a revoke record using a private key associated with a revoker device and making an entry in the blockchain only when a public key of the revoker device is either the public key of the end user to which the at least one attestation token was issued by the at least one attestation issuing party or the public key of the at least one attestation issuing party.

In yet another aspect, one or more non-transitory computer readable storage mediums storing one or more sequences of instructions, which when executed by one or more processors, causes a processor implemented method for blockchain-based secure credential and token management for open identity management that enables a first device to provision at least one additional device to present tokens issued to the first device is provided. The one or more sequences of instructions, which when executed by one or more processors, further causes: (i) obtaining a first set of credentials including a blockchain-compatible public-private key pair associated with the end user, the first set of credentials are created by a hardware-based cryptographic processor on a first device associated with an end user, the blockchain-compatible public-private key pair includes an end user public key and an end user private key, and the end user public key is published and the end user private key is protected by at least one of the end user's password, biometric or PIN code; (ii) obtaining and caching at least one attestation token from at least one attestation issuing party, the at least one attestation token is restricted by default to be unusable from any device other than the first device, and the at least one attestation issuing party attests information that they are authorized to validate with reference to the end user; (iii) providing the at least one attestation token to at least one relying party, the validity of the at least one attestation token is determined using a blockchain, and (iv) signing a trust record on the blockchain using the first device associated with the end user to indicate that the first set of credentials trusts a second set of credentials associated with a second user device as long as the first set of credentials are valid, to indicate to the at least one relying party that the at least one attestation token presented by the second set of credentials from the second device are acceptable to the blockchain, and signing the trust record on the blockchain overcomes the restriction by default that the at least one attestation token is to be unusable from any device other than the first device.

A revoke privilege to the second device is delegated that signs a revoke record on the blockchain referencing the first device to decommission the first device. In another embodiment, delegate credentials and a policy for delegation for the first device are registered on the blockchain. In yet another embodiment, the delegate credentials include designating that the second set of credentials on the second device has permissions to revoke the first set of credentials on the first device, so that the second device can revoke the first set of credentials on the first device by signing a blockchain transaction from the second device.

In yet another embodiment, the one or more sequences of instructions, which when executed by one or more processors, further causes designating at least one device other than the first device to have permission to take over the first set of credentials from the first device and assign the first set of credentials to a new device, by designating that the at least one device have to sign a takeover transaction on the blockchain. In yet another embodiment, when the attestation issuing party issues at least one attestation token to the first device associated with end user, the at least one attestation token is registered on the blockchain by associating the at least one attestation token with the public key of the end user and are signed by the issuing party private key. In yet another embodiment, an attestation token is revoked by signing a revoke record using a private key associated with a revoker device and making an entry in the blockchain only when a public key of the revoker device is either the public key of the end user to which the at least one attestation token was issued by the at least one attestation issuing party or the public key of the at least one attestation issuing party.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 2A illustrates a credentials revoked table that is registered on the blockchain infrastructure of FIG. 1 according to an embodiment herein;

FIG. 2B illustrates a credentials delegate table that is registered on the blockchain infrastructure of FIG. 1 according to an embodiment herein;

FIG. 2C illustrates a token registry table that is registered on the blockchain infrastructure of FIG. 1 according to an embodiment herein;

FIG. 2D illustrates a token revoked table that is registered on the blockchain infrastructure of FIG. 1 according to an embodiment herein;

DETAILED DESCRIPTION OF PREFERRED EMBODIMENTS

Figure 1:
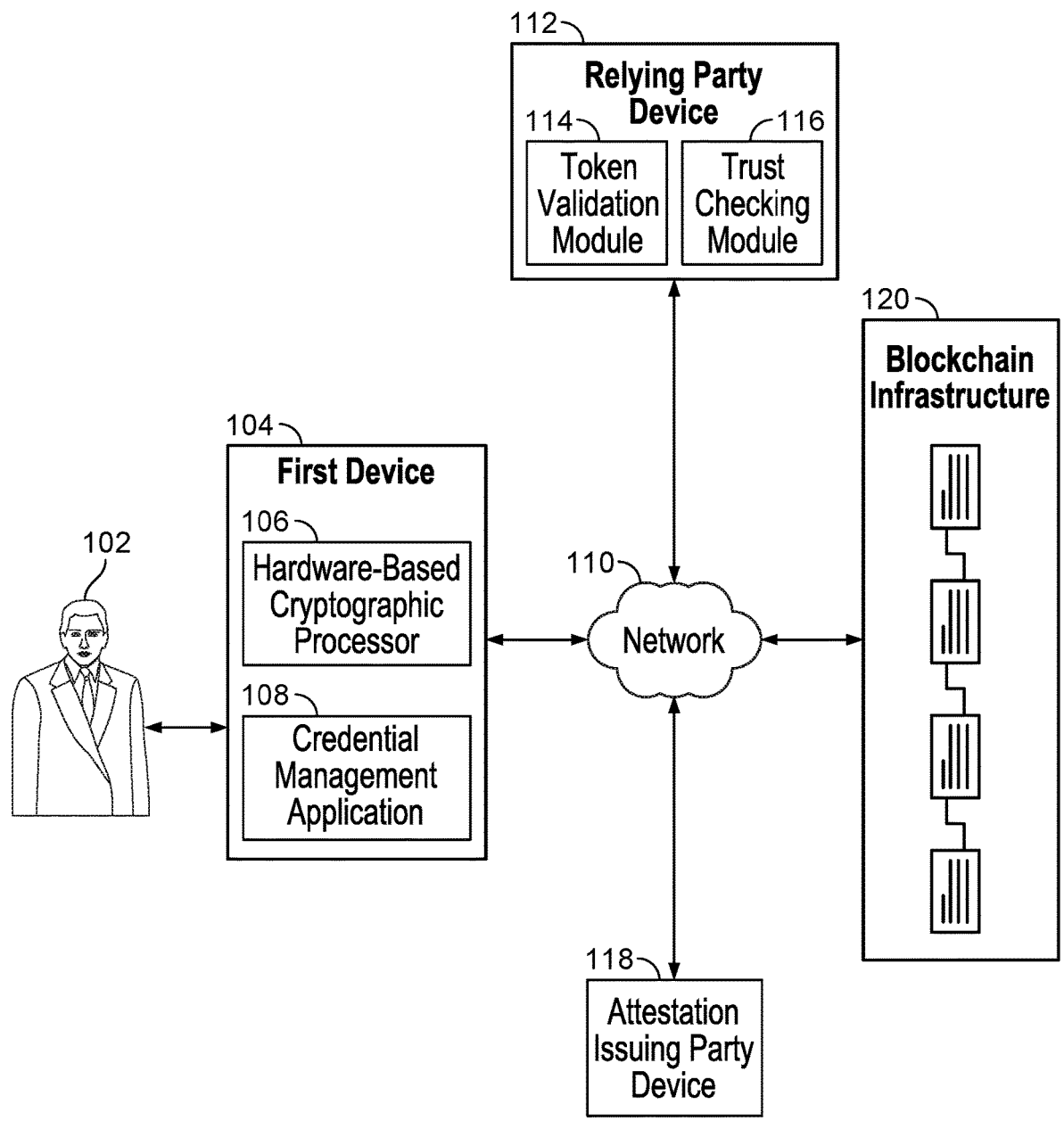
FIG. 1 illustrates a system view of a blockchain-based secure credential and token management for open identity management that enables a first device to provision at least one additional devices to present tokens issued to the first device according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

There is a need for a system and method of blockchain-based secure credential and token management for open identity management. Referring now to the drawings, and more particularly to FIGS. 1 through 4, where similar reference characters denote corresponding features consistently throughout the figures, preferred embodiments are shown.

FIG. 1 illustrates a system view of a blockchain-based secure credential and token management for open identity management that enables a first device 104 to provision at least one additional device to present tokens issued to the first device 104 according to an embodiment herein. The system view includes an end-user 102, the first device 104, a network 110, a relying party device 112, an attestation issuing party device 118 and a blockchain infrastructure 120. The first device 104 includes a hardware based cryptographic processor 106 and a credential management application 108. The first device also includes a device processor (e.g. not shown). The relying party device 112 includes a token validation module 114 and a trust checking module 116. The relying party and the attestation issuing party may include a website or an application. The end-user 102 may self-provision his/her identify credentials by downloading and initializing the credential management application 108 on the first device 104. The hardware based cryptographic processor 106 (e.g. a Secure Enclave processor, ARM Trustzone) creates a first set of credentials including a blockchain-compatible public-private key pair associated with the end user 102.

The hardware based cryptographic processor 106 is a dedicated computer on a chip (e.g. system-on-a-chip) or microprocessor for carrying out cryptographic operations, embedded in a packaging with multiple physical security measures, which give it a degree of tamper resistance. A secure crypto-processor may not output decrypted data or decrypted program instructions in an environment where security cannot always be maintained. The hardware based cryptographic processor 106 also segregates the cryptographic operations from the device processor and thus improves speed and efficiency, and improves battery life. For example, iOS® devices may include an advanced encryption standard (AES) 256 crypto engine that is built into a direct memory access (DMA) path between a flash storage and main system memory. The Snapdragon 820 processor that is used by certain Android devices also includes a crypto engine.

In one embodiment, the identify credentials include a blockchain-compatible public-private key pair associated with the end user 102.

The first set of blockchain-compatible public-private key pair includes an end user public key and an end user private key. In one embodiment, the end user public key is published and the end user 102 private key is protected by at least one of the end user's 102 password, biometric or PIN code. In another embodiment, the end user private key cannot ordinarily be extracted out of the hardware-based cryptographic processor 106 by any of a device or operating system (OS) manufacturer, the end user 102, or a party that manages an open identity network. The first device 104 may be but it is not limited to a laptop, a mobile phone, a tablet and a personal computer.

The token validation module 114 validates the at least one attestation token that is signed using a second set of credentials and a second private key that is associated with a second device by checking that a token identification (ID) is not revoked, a public key that is associated with the second set of credentials is not revoked, and that trust exists between the first set of credentials and the second set of credentials; for example:

CheckTokenValidity (TokenID, CredAPubKey) signed by CredB Private Key
{
Check TOKENS_REVOKED that TokenID is not Revoked.
Check that CredBPubKey is not revoked and that ExistsTrust(CredA, CredB).
}

The trust checking module 116 checks whether trust exists between the first set of credentials and the second set of credentials based on whether they are equal, or whether a sequence of records exists in a trust credentials record in the blockchain which establish a trust relationship between the first set of credentials and the second set of credentials, for example:

ExistsTrust(CredA, CredC) is TRUE if and only if either A=C, or there exists a sequence of records (CredA, CredB1), (CredB1, CredB2), (CredBn, C) in CREDENTIALS_TRUST which establish a trust relationship between CredA and CredC.

FIG. 2A illustrates a credentials revoked table that is registered on the blockchain infrastructure 120 of FIG. 1 according to an embodiment herein. The blockchain infrastructure 120 serves as the registry of the credentials and the attestation tokens. The table tracks the state of the credentials and the attestation tokens. The table includes i) a CredAPubKey 202: The end user public key of credentials A being revoked, ii) a CredBPubKey 204: The end user public key of credentials B that revoked the credentials A (e.g. which may be the same as Credentials A), iii) a TxID 206: Transaction ID of transaction that created this entry, iv) and a ContractName 208: Contract that created this entry.

FIG. 2B illustrates a credentials delegate table that is registered on the blockchain infrastructure of FIG. 1 according to an embodiment herein. The table includes i) the CredAPubKey 202: The end user public key of the credentials A, where A delegates permissions to B, ii) a CredBPubKeySet 210: set of end user's public keys of the credentials B (multiple), where A delegates permissions to B, iii) permissions 212: What type of permission is being delegated (e.g. Revoke or TakeOver), iv) a Quorum 214: How many of the credentials B need to sign (with their end user's private keys) in order for the delegated operation to be valid, v) the TxID 206: the transaction ID of transaction that created this entry, the ContractName 208: the contract that created this entry.

FIG. 2C illustrates a token registry table that is registered on the blockchain infrastructure of FIG. 1 according to an embodiment herein. The table includes i) the TokenID 216: The transaction ID of the attestation token being registered, ii) the CredAPubKey 202: The end user public key of the credentials A to which the attestation token is issued, iii) the IssuerPubKey 218: The end user public key of the Issuer, iv) the TxID 206: the transaction ID of transaction that created this entry, and v) the ContractName 208: Contract that created this entry.

FIG. 2D illustrates a token revoked table that is registered on the blockchain infrastructure of FIG. 1 according to an embodiment herein. The table includes i) the TokenID 216: The transaction ID of the attestation token being revoked, ii) a RevokerPubKey 220: The end user public key of revoker, iii) the TxID 206: the transaction ID of transaction that created this entry, and iv) the ContractName 208: Contract that created this entry.

Figure 3:
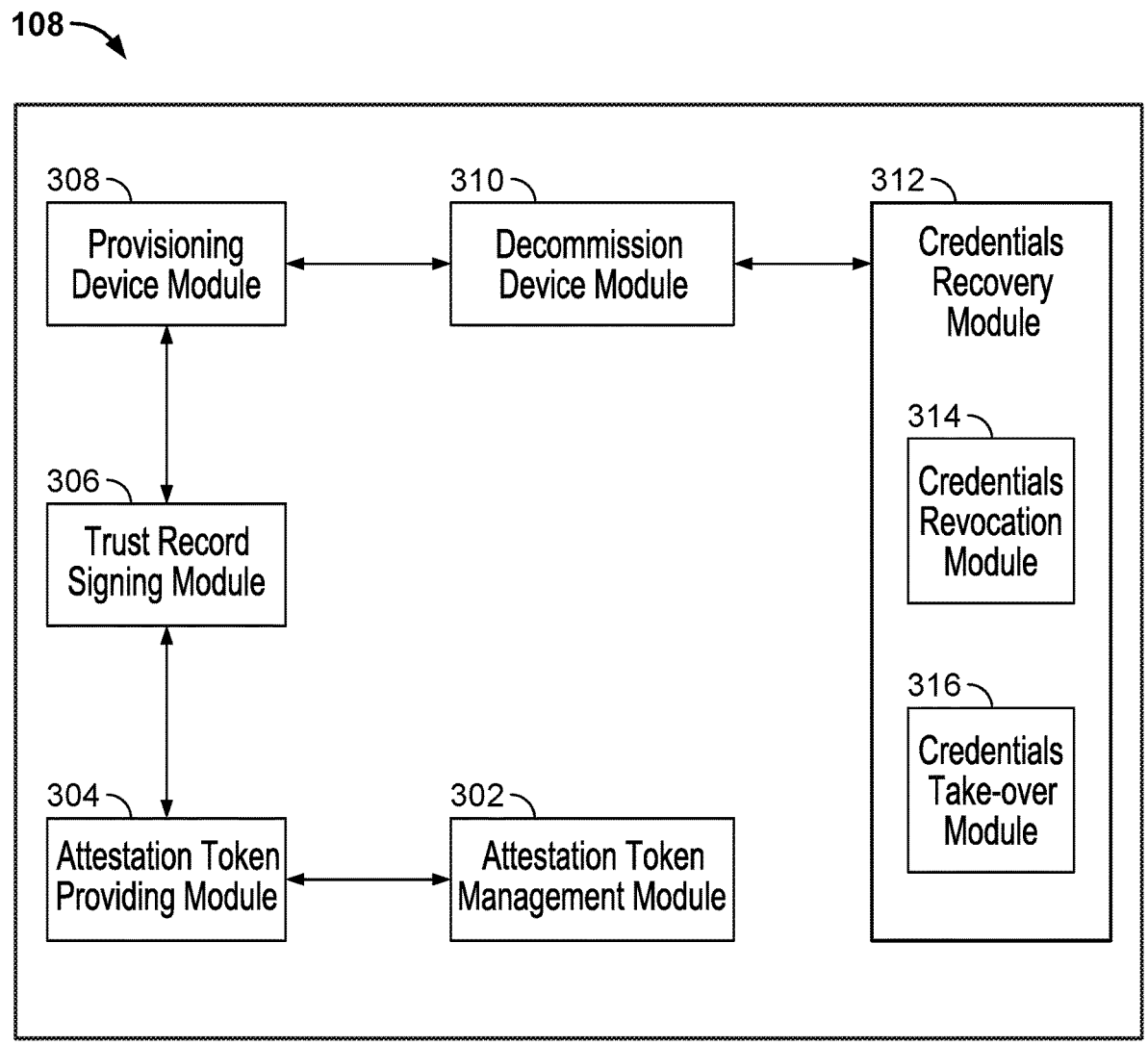
FIG. 3 illustrates an exploded view of a credential management application of the first device of FIG. 1 according to an embodiment herein.

FIG. 3 illustrates an exploded view of a credential management application of the first device of FIG. 1 according to an embodiment herein. The exploded view includes an attestation token management module 302, an attestation token providing module 304, a trust record signing module 306, a provisioning device module 308, a decommission device module 310 and credentials recovery module 312.

The attestation token management module 302 obtains and caches at least one attestation token from the attestation issuing party device 118 of an attestation issuing party via the network 110. In one embodiment, the at least one attestation token is restricted by default to be unusable from any device other than the first device 104. In another embodiment, the attestation issuing party attests information that they are authorized to validate with reference to the end user 102. The attestation issuing party issues attestations (or identify tokens) about the end-user 102 which is signed with the end user private key and referencing the end-user public key. For example, the Department of Motor Vehicles (DMV) may issue the information as the at least one attestation token about the end-user 102 that is on his/her driver's license (e.g. name, date of birth, address, type of license etc.). Similarly, a university may issue the information of the end user 102 as the at least one attestation token (e.g. listing his/her degree earned, the year of graduation etc.).

The attestation token providing module 304 provides the at least one attestation token to at least one relying party via the network 110. In one embodiment, the validity of the at least one attestation token is determined using the blockchain infrastructure 120. In the credential management application 108, the end-user 102 caches the at least one attestation token on the first device 104 and may share particular selected tokens of the identify tokens with the relying party device 112 of a relying party they choose. The at least one relying party is any party that is interested in attestations about the end-user 102. For example, a peer-to-peer rental site may be interested in knowing the end-user's 102 name and date of birth, while an employer might be interested in the end-user's 102 university degree. The at least one relying party may request the at least one attestation token from the end-user 102 who can choose what they share with a particular relying party. The credential management application 108 then helps the at least one relying party to verify the validity of the at least one attestation token (e.g. who the issuer is, is it issued to this user, is it still valid etc.).

The trust record signing module 306 signs a trust record on the blockchain using the first device 104 associated with the end user 102 to indicate that the first set of credentials trusts a second set of credentials associated with a second user device as long as the first set of credentials are valid, to indicate to the at least one relying party that the at least one attestation token presented by the second set of credentials from the second device are acceptable to the blockchain. In one embodiment, signing the trust record on the blockchain overcomes a restriction by default that the at least one attestation token is to be unusable from any device other than the first device 104. In another embodiment, signing a revoke record on the blockchain to revoke the first set of credentials associated with the first device 104 that is associated with the end user 102. In another embodiment, the credential management application 108 registers delegate credentials and a policy for delegation for the first device 104 on the blockchain. The delegate credentials include designating that the second set of credentials on the second device has permissions to revoke the first set of credentials on the first device 104, so that the second device can revoke the first set of credentials on the first device by signing a blockchain transaction from the second device.

The delegate credentials include designating at least one device other than the first device 104 to have permission to take over the first set of credentials from the first device 104 and assign the first set of credentials to a new device, by designating that the at least one device have to sign a takeover transaction on the blockchain. In one embodiment, when the attestation issuing party issues the at least one attestation token to the first device 104 associated with end user 102, the at least one attestation token is registered on the blockchain by associating the at least one attestation token with the public key of the end user 102 and are signed by the issuing party private key. In another embodiment, an attestation token is revoked by signing a revoke record using a private key associated with the revoker party device 112 and making an entry in the blockchain only when a public key of the revoker party device 112 is either the public key of the end user 102 to which the at least one attestation token was issued by the attestation issuing party or the public key of the at least one attestation issuing party.

The provisioning device module 308 enables the end-user 102 to provision additional devices, each with the first set of credentials (i.e. a blockchain compatible key-pair).

The additional device may either belong to the same end user 102 or to another user who is trusted by the end user 102. The credentials recovery module 312 may also enable recovery of data from the first device 104 to the additional device by designating that the credentials of the additional device has the permission to recover data from the first device 104. The first device 104 may create and save a recovery key (e.g. using the hardware-based cryptographic processor 106) and register the recovery key with the blockchain. When the additional device recovers the data from the first device 104, the blockchain registers that the additional device has recovered data from the first device 104.

The credential management application 108 allows the end user 102 to copy and transfer the at least one attestation token from one device to another. In one embodiment, the at least one attestation token is unusable from any device other than the first device 104 as the at least one attestation token reference the public key on the first device 104, i.e., original device. To handle this, the end-user 102 can sign "trust" records on the blockchain that signal that the first set of credentials (e.g. credentials A) trusts the second set of credentials. The following signals to any relying party that tokens presented by the second set of credentials (e.g. credentials B) are acceptable even if they were originally issued to the first set of credentials. For example, this is implemented as:

Trust (CredAPubKey, CredBPubKey) signed by private key of Credentials A Adds record [CredAPubKey, CredBPubKey, TxID, Trust] to CREDENTIALS_TRUST if and only if CredA is still valid (not in CREDENTIALS_REVOKED)

The decommission device module 310 revokes the first set of credentials of the end user's 102 by posting a record on the blockchain. For example, this is implemented as:

Revoke (CredAPubKey) signed by Cred A private key
Adds record [CredAPubKey, CredAPubKey, TxID, Revoke] to CREDENTIALS_REVOKED The credentials recovery module 312 enables the end-user 102 to pre-provision their back-up devices to handle the lost or stolen device cases when the first set of credentials registering it's "delegate" credentials and the policy for delegation. The credentials recovery module 312 includes a credentials revocation module 314 and a credentials takeover module 316. The credentials revocation module 314 enables the end-user 102 to designate who has permission to revoke his/her credentials on the first device 104. For example, the end user 102 may designate that their credentials on the second device has permissions to revoke their Credentials on the first device 104. For example, this is implemented as:

Delegate (CredAPubKey, CredBPubKey, Revoke) signed by Credentials A private key Adds record [CredAPubKey, {CredBPubKey}, REVOKE, 1, TxID, Trust] to CREDENTIALS_DELEGATE if and only if CredA is still valid (not in CREDENTIALS_REVOKED)

If the end user 102 loses the first device 104, the end user 102 can then use the second device to revoke the credentials on the first device 104 by signing a blockchain transaction from the second device. For example, this is implemented as:

Revoke (CredAPubKey) signed by CredC private key if and only if CredC is still valid (not in CREDENTIALS_REVOKED) and [CredAPubKey, CredBPubKey] is in CREDENTIALS_DELEGATE and ExistsTrust(CredB, CredC)

The credentials takeover module 316 enables the end user 102 to designate who has the permission to take-over the credentials from the first device 104 and assign it to a fourth device. For example, the end-user 102 may designate that in order to do this, both the second device and the third device have to sign the takeover transaction on the blockchain. For example, this is implemented as:

Delegate (CredAPubKey, {CredBPubKey, CredCPubKey}, TAKEOVER) signed by CredA private key
Adds record [CredAPubKey, {CredBPubKey, CredCPubKey}, TAKEOVER, 2, TxID, Delegate] to CREDENTIALS_DELEGATE if and only if CredA is still valid If the end user 102 loses the first device 104, and then buys a new device, it can be provisioned to take over the credentials on the first device 104 if both the second device and the third device sign a transaction. For example, this is implemented as:

TakeOver (CredAPubKey, CredFPubKey) signed by Cred D private key, Cred E private key Adds record [CredAPubKey, CredFPubKey, TxID, Take-Over] to CREDENTIALS_TRUST if an only if Cred D and Cred E are still valid and there is a record [CredAPubKey, {CredBPubKey, CredCPubKey}, TAKEOVER] in CREDENTIALS_DELEGATE and ExistsTrust(CredB, CredD) and ExistsTrust(CredC, CredE).

Figure 4:
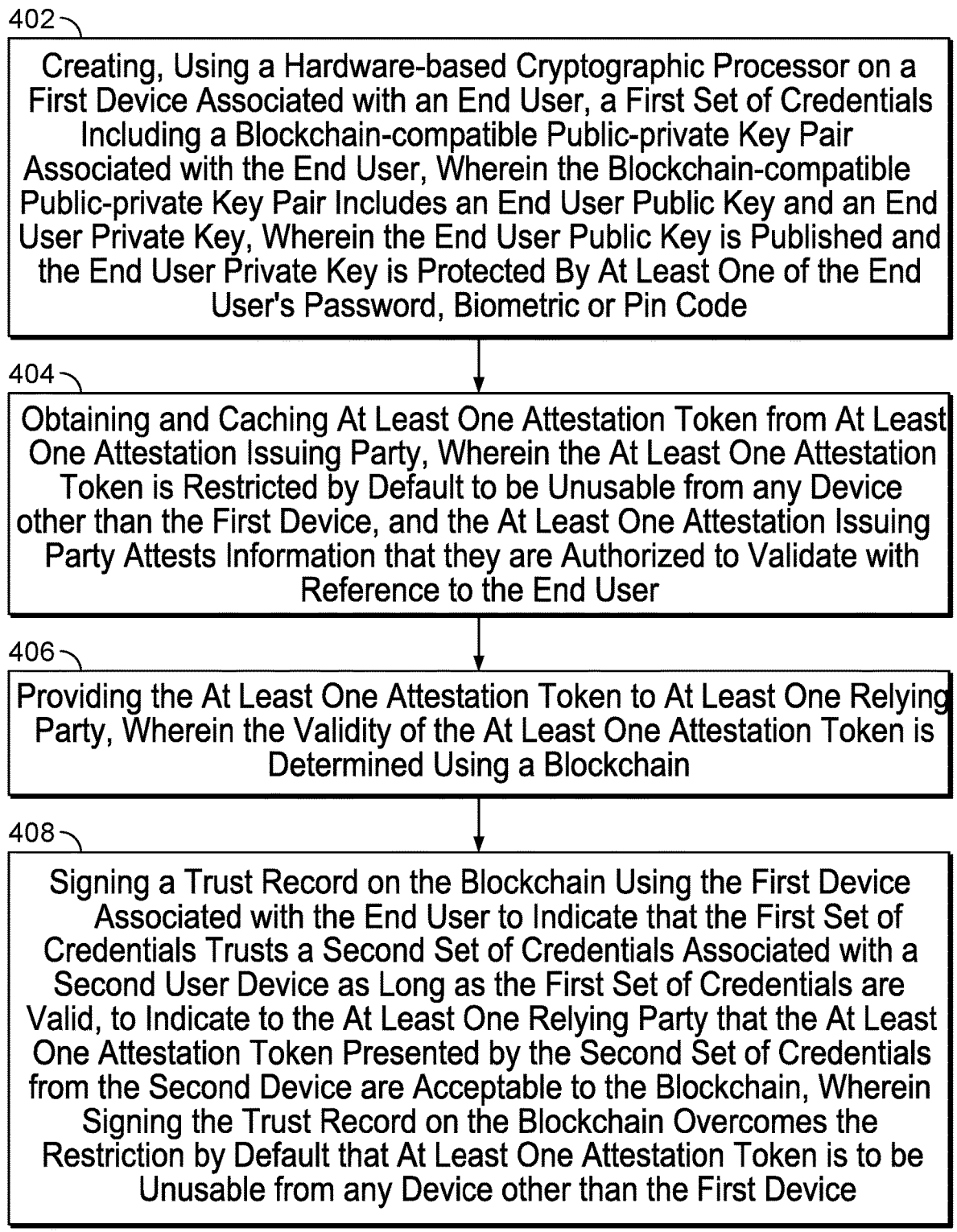
FIG. 4 is a flow diagram illustrating a method of blockchain-based secure credential and token management for open identity management of FIG. 1 according to an embodiment herein.

FIG. 4 is a flow diagram illustrating a method of blockchain-based secure credential and token management for open identity management of FIG. 1 according to an embodiment herein. At step 402, the first set of credentials including a blockchain-compatible public-private key pair associated with the end user 102 is created, using a hardware-based cryptographic processor 106 on the first device 104 associated with the end user 102. In one embodiment, the first set of blockchain-compatible public-private key pair includes the end user public key and the end user private key. In another embodiment, the end user public key is published and the end user private key is protected by at least one of the end user's password, biometric or PIN code. In one embodiment the end user private key cannot ordinarily be extracted out of the hardware-based cryptographic processor 106 by any of a device or OS manufacturer, the end user 102, or a party that manages an open identity network. At step 404, at least one attestation token is obtained and cached from at least one attestation issuing party. In one embodiment, the at least one attestation token is restricted by default to be unusable from any device other than the first device 104, and the at least one attestation issuing party attests information that they are authorized to validate with reference to the end user 102.

At step 406, the at least one attestation token to at least one relying party is provided. In one embodiment, the validity of the at least one attestation token is determined using a blockchain. At step 408, the trust record on the blockchain is signed using the first device 104 associated with the end user 102 to indicate that the first set of credentials trusts a second set of credentials associated with a second user device as long as the first set of credentials are valid, to indicate to the at least one relying party that the at least one attestation token presented by the second set of credentials from the second device are acceptable to the blockchain. In one embodiment, signing the trust record on the blockchain overcomes the restriction by default that attestation tokens are to be unusable from any device other than the first device 104. For example, the first device 104 may register at least one designated device that can sign a TAKEOVER record with an appropriate quorum, Subsequently, the at least one registered designated device may sign the TAKEOVER record to enable them to take over from the initial device.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A processor implemented method for blockchain-based secure credential and token management for open identity management that enables a first device to provision at least one additional device to present tokens issued to the first device, the method comprising:

creating, using a hardware-based cryptographic processor on a first device associated with an end user, a first set of credentials comprising a blockchain-compatible public-private key pair associated with the end user, wherein the blockchain-compatible public-private key pair comprises an end user public key and an end user private key, wherein the end user public key is published and the end user private key is protected by at least one of the end user's password, biometric or PIN code;

obtaining and caching at least one attestation token from at least one attestation issuing party, wherein the at least one attestation token is restricted by default to be unusable from any device other than the first device, and the at least one attestation issuing party attests information that they are authorized to validate with reference to the end user;

providing the at least one attestation token to at least one relying party, wherein the validity of the at least one attestation token is determined using a blockchain; and signing a trust record on the blockchain using the first device associated with the end user to indicate that the first set of credentials trusts a second set of credentials associated with a second user device as long as the first set of credentials are valid, to indicate to the at least one relying party that the at least one attestation token presented by the second set of credentials from the second device are acceptable to the blockchain, wherein signing the trust record on the blockchain overcomes the restriction by default that the at least one attestation token is to be unusable from any device other than the first device, wherein the trust record indicates a quorum of credentials associated with the second set of credentials are needed to sign to revoke the first set of credentials.

2. The processor implemented method of claim 1, further comprising:

delegating a revoke privilege to the second device that signs a revoke record on the blockchain referencing the first device to decommission the first device.

3. The processor implemented method of claim 1, further comprising:

registering delegate credentials and a policy for delegation for the first device on the blockchain.

4. The processor implemented method of claim 3, wherein the delegate credentials comprise designating that the second set of credentials on the second device has permissions to revoke the first set of credentials on the first device, so that the second device can revoke the first set of credentials on the first device by signing a blockchain transaction from the second device.

5. The processor implemented method of claim 3, wherein the delegate credentials comprise designating at least one device other than the first device to have permission to take over the first set of credentials from the first device and assign the first set of credentials to a new device, by designating that the at least one device have to sign a take over transaction on the blockchain.

6. The processor implemented method of claim 1, wherein when the at least one attestation issuing party issues at least one attestation token to the first device associated with end user, the at least one attestation token is registered on the blockchain by associating the at least one attestation token with the public key of the end user and are signed by the issuing party private key.

7. The processor implemented method of claim 1, wherein an attestation token is revoked by signing a revoke record using a private key associated with a revoker device and making an entry in the blockchain only when a public key of the revoker device is either the public key of the end user to which the attestation token was issued by the at least one attestation issuing party or the public key of the at least one attestation issuing party.

8. A system for blockchain-based secure credential and token management for open identity management that enables a first device to provision at least one additional device to present tokens issued to the first device, the system comprising:
 a hardware-based cryptographic processor that is configured to create, on the first device associated with an end user, a first set of credentials comprising a blockchain-compatible public-private key pair associated with the end user, wherein the blockchain-compatible public-private key pair comprises an end user public key and an end user private key, wherein the end user public key is published and the end user private key is protected by at least one of the end user's password, biometric or PIN code;
 a device processor; and
 a non-transitory computer readable storage medium comprising one or more modules executable by said device processor, wherein said one or more modules comprises
  an attestation token management module that obtains and caches at least one attestation token from at least one attestation issuing party, wherein the at least one attestation token is restricted by default to be unusable from any device other than the first device, and the at least one attestation issuing party attest information that they are authorized to validate with reference to the end user;
  an attestation token providing module that provides the at least one attestation token to at least one relying party device associated with at least one relying party, wherein the validity of the at least one attestation token is determined using a blockchain; and
  a trust record signing module that signs a trust record on the blockchain using the first device associated with the end user to indicate that the first set of credentials trusts a second set of credentials associated with a second user device as long as the first set of credentials are valid, to indicate to the at least one relying party that the at least one attestation token presented by the second set of credentials from the second device are acceptable to the blockchain, wherein signing the trust record on the blockchain overcomes the restriction by default that the at least one attestation token is to be unusable from any device other than the first device, wherein the trust record indicates a quorum of credentials associated with the second set of credentials are needed to sign to revoke the first set of credentials.

9. The system of claim 8, wherein said one or more modules further comprises
 a device decommissioning module that delegates a revoke privilege to the second device that signs a revoke record on the blockchain referencing the first device to decommission the first device; and
 a credential registering module that registers delegate credentials and a policy for delegation for the first device on the blockchain.

10. The system of claim 8, wherein said at least one relying party device comprise
 a token validation module that validates the at least one attestation token that is signed using a second set of credentials and a second private key that is associated with a second device by checking that a token ID is not revoked, a public key that is associated with the second set of credentials is not revoked, and that trust exists between the first set of credentials and the second set of credentials; and
 a trust checking module that checks whether trust exists between the first set of credentials and the second set of credentials based on whether they are equal, or whether a sequence of records exists in a trust credentials record in the blockchain which establish a trust relationship between the first set of credentials and the second set of credentials.

11. The system of claim 10, wherein the delegate credentials comprise designating that the second set of credentials on the second device has permissions to revoke the first set of credentials on the first device, so that the second device can revoke the first set of credentials on the first device by signing a blockchain transaction from the second device, and wherein the delegate credentials comprise designating at least one device other than the first device to have permission to take over the first set of credentials from the first device and assign the first set of credentials to a new device, by designating that the at least one device have to sign a takeover transaction on the blockchain.

12. The system of claim 8, wherein when the attestation issuing party issues at least one attestation token to the first device associated with end user, the at least one attestation token is registered on the blockchain by associating the at least one attestation token with the public key of the end user and are signed by the issuing party private key.

13. The system of claim 8, wherein an attestation token is revoked by signing a revoke record using a private key associated with a revoker device and making an entry in the blockchain only when a public key of the revoker device is either the public key of the end user to which the attestation token was issued by the at least one attestation issuing party or the public key of the at least one attestation issuing party.

14. One or more non-transitory computer readable storage mediums storing one or more sequences of instructions, which when executed by one or more processors, causes a processor implemented method for blockchain-based secure credential and token management for open identity management that enables a first device to provision at least one additional device to present tokens issued to the first device by performing the steps of:
 obtaining a first set of credentials comprising a blockchain-compatible public-private key pair associated with the end user, wherein the first set of credentials are created by a hardware-based cryptographic processor on the first device associated with an end user, wherein the blockchain-compatible public-private key pair comprises an end user public key and an end user private key, wherein the end user public key is published and the end user private key is protected by at least one of the end user's password, biometric or PIN code;
 obtaining and caching at least one attestation token from at least one attestation issuing party, wherein the at least one attestation token is restricted by default to be unusable from any device other than the first device, and the at least one attestation issuing party attests information that they are authorized to validate with reference to the end user;

providing the at least one attestation token to at least one relying party, wherein the validity of the at least one attestation token is determined using a blockchain; and signing a trust record on the blockchain using the first device associated with the end user to indicate that the first set of credentials trusts a second set of credentials associated with a second user device as long as the first set of credentials are valid, to indicate to the at least one relying party that the at least one attestation token presented by the second set of credentials from the second device are acceptable to the blockchain, wherein signing the trust record on the blockchain overcomes the restriction by default that the at least one attestation tokens is to be unusable from any device other than the first device, wherein the trust record indicates a quorum of credentials associated with the second set of credentials are needed to sign to revoke the first set of credentials.

15. The one or more non-transitory computer readable storage mediums storing the one or more sequences of instructions of claim 14, which when executed by the one or more processors further causes delegating a revoke privilege to the second device that signs a revoke record on the blockchain referencing the first device to decommission the first device.

16. The one or more non-transitory computer readable storage mediums storing the one or more sequences of instructions of claim 15, which when executed by the one or more processors further causes registering delegate credentials and a policy for delegation for the first device on the blockchain.

17. The one or more non-transitory computer readable storage mediums storing the one or more sequences of instructions of claim 16, wherein the delegate credentials comprise designating that the second set of credentials on the second device has permissions to revoke the first set of credentials on the first device, so that the second device can revoke the first set of credentials on the first device by signing a blockchain transaction from the second device.

18. The one or more non-transitory computer readable storage mediums of claim 16, wherein the delegate credentials comprise designating at least one device other than the first device to have permission to take over the first set of credentials from the first device and assign the first set of credentials to a new device, by designating that the at least one device have to sign a take over transaction on the blockchain.

19. The one or more non-transitory computer readable storage mediums of claim 14, wherein when the at least one attestation issuing party issues at least one attestation token to the first device associated with end user, the at least one attestation token is registered on the blockchain by associating the at least one attestation token with the public key of the end user and are signed by the issuing party private key.

20. The one or more non-transitory computer readable storage mediums of claim 14, wherein an attestation token is revoked by signing a revoke record using a private key associated with a revoker device and making an entry in the blockchain only when a public key of the revoker device is either the public key of the end user to which the attestation token was issued by the at least one attestation issuing party or the public key of the at least one attestation issuing party.

* * * * *